US006679823B2

(12) United States Patent
Smith

(10) Patent No.: US 6,679,823 B2

(45) Date of Patent: Jan. 20, 2004

(54) TREATMENT OF ELECTRIC ARC FURNACE DUST TO RESIST ACID AND ALKALINE LEACHING OF HEAVY METALS

(75) Inventor: Charles L. Smith, Conshohocken, PA (US)

(73) Assignee: Envirosafe Services of Ohio, Inc., Oregon, OH (US)

( * ) Notice: Subject to any disclaimer, the term of this patent is extended or adjusted under 35 U.S.C. 154(b) by 0 days.

(21) Appl. No.: 09/848,930

(22) Filed: May 4, 2001

(65) Prior Publication Data

US 2003/0023128 A1 Jan. 30, 2003

(51) Int. Cl.[7] ............................ C04B 35/00; A62D 3/00

(52) U.S. Cl. ....................... 588/256; 588/252; 588/257; 106/710; 106/763; 501/155

(58) Field of Search ................................ 588/252, 256, 588/257; 106/707, 705, 710, 763; 501/155

(56) References Cited

U.S. PATENT DOCUMENTS

| | | | | | |
|---|---|---|---|---|---|
| 3,630,713 | A | * | 12/1971 | Adams et al. | 71/61 |
| 3,819,360 | A | * | 6/1974 | Adams et al. | 106/801 |
| 4,028,130 | A | * | 6/1977 | Webster et al. | 106/697 |
| RE29,783 | E | | 9/1978 | Smith et al. | |
| 4,613,374 | A | * | 9/1986 | Smith | 106/706 |
| 4,629,509 | A | * | 12/1986 | O'Hara et al. | 106/697 |
| 4,775,539 | A | * | 10/1988 | Van de Walle | 426/623 |
| 4,840,671 | A | | 6/1989 | Lynn et al. | |
| 4,889,640 | A | | 12/1989 | Stanforth | |
| 4,911,757 | A | | 3/1990 | Lynn et al. | |
| 5,037,479 | A | | 8/1991 | Stanforth | |
| 5,202,033 | A | | 4/1993 | Stanforth et al. | |
| 5,245,120 | A | * | 9/1993 | Srinivasachar et al. | 588/256 |
| 5,245,122 | A | | 9/1993 | Smith | |
| 5,252,003 | A | | 10/1993 | McGahan | |
| 5,259,697 | A | * | 11/1993 | Allen et al. | 106/697 |
| 5,399,048 | A | * | 3/1995 | Walker, Jr. | 405/129.9 |
| 5,512,257 | A | | 4/1996 | Frey | |
| 5,545,805 | A | | 8/1996 | Chesner | |
| 5,569,152 | A | | 10/1996 | Smith | |
| 5,719,099 | A | | 2/1998 | Bhat | |
| 5,769,961 | A | * | 6/1998 | Peters et al. | 134/25.1 |
| 5,788,623 | A | | 8/1998 | Studer et al. | |
| 5,851,404 | A | | 12/1998 | Christy et al. | |
| 5,853,474 | A | | 12/1998 | Hilton | |
| 6,053,857 | A | * | 4/2000 | Stevens | 106/709 |
| 6,191,068 | B1 | * | 2/2001 | Bhat | 423/239.1 |

OTHER PUBLICATIONS

EPA 40 CFR Part 261, [SW–FRL–5219–5] Hazardous Waste management System; Identification and Listing of Hazardous Waste; Final Exclusion; Jun. 13, 1995, Federal RegisterVol 60, No. 113, 14 pages, www.epa.goc/fedrgstr/EPA–WASTE/1995/Jun./Day–13/pr–247.html.*

EPA publication SW–846, entitled Test Methods for Evaluating Solid Waste, Physical/Chemical Methods, EPA Method 1311:Toxicity Characteristic Leaching Procedure, Rev. 5 Apr. 1998. chapter 8.4, 35 pages.*

EPA publication SW–846, entitled Test Methods for Evaluating Solid Waste, Physical/Chemical Methods, EPA Method 1312: Synthetic Precipitation Leaching Procedure, Rev. 5 Apr. 1998, chapter 6, 30 pages.*

EPA publication SW–846, entitled Test Methods for Evaluating Solid Waste, Physical/Chemical Methods, EPA Method 1320: Multiple Extraction Procedure, Rev. 5 Apr. 1998, chapter 6, 4 pages.*

All three publicaitons above were Last updated on Tuesday, Jan. 7th, 2003 and downloaded from URL: http://www.epa.gov/epaoswer/hazwaste/test/1_series.htm.*

* cited by examiner

*Primary Examiner*—Robert J. Sandy
*Assistant Examiner*—Katherine Mitchell
(74) *Attorney, Agent, or Firm*—RatnerPrestia

(57) ABSTRACT

A supplemental agent for a hazardous waste composition containing electric arc furnace dust (EAFD) includes potassium magnesium sulfate or a magnesium salt such as magnesium sulfate or magnesium chloride. The supplemental agent when mixed with EAFD and water, along with either lime inherent within the EAFD or added lime, reduces the leaching of heavy metals from the waste composition over a wide range of leaching conditions, including both acidic, neutral, and alkaline environments. The method for reducing the concentration of heavy metals in a leachate from the EAFD involves forming a mixture of EAFD, water, the supplemental agent, and, optionally, ferrous sulfate, along with lime, then permitting the mixture to react.

31 Claims, No Drawings

TREATMENT OF ELECTRIC ARC FURNACE DUST TO RESIST ACID AND ALKALINE LEACHING OF HEAVY METALS

FIELD OF THE INVENTION

The present invention pertains to the stabilization of electric arc furnace dust (EAFD) and, more specifically, the reduction of leaching of heavy metals from EAFD in both acidic and alkaline environments.

BACKGROUND OF THE INVENTION

The electric arc furnace process is a common steel making practice in use for many years. In a typical electric arc furnace process, solid charge ingredients including raw scrap, lime, burnt lime, iron ore and ferro-alloy additives are placed in a top-charge furnace unit.

A conventional furnace unit is equipped with (1) a roof lift and swing arrangement which permits the roof to swing aside when cold scrap is charged into the furnace, (2) a rocker and rail tilting type arrangement which permits the furnace to tilt forward for tapping and backward for slagging, (3) a system for additions through the furnace roof, and (4) evacuation systems for the removal of dust generated during the steel making cycle.

In an electric arc furnace, electrodes are supported by electrode arms and clamps and project from overhead down through the furnace roof. An electric arc surging between the electrodes and through the furnace charge, typically comprising largely scrap metal, produces heat which melts the charge and refines the steel. The molten steel is tapped, typically at about 3000° F., into a ladle and cast into blooms or poured into ingot molds.

In such a process, particulate emissions are generated during (1) the charging of scrap, (2) the tapping of furnaces, (3) the pneumatic injection of additives, (4) oxygen blowing, and (5) meltdown/refining periods. This particulate, which is individually and collectively referred to as electric arc furnace dust (hereinafter EAFD), is typically collected either as a dry waste in baghouses but can also be collected wet, as a sludge.

In its emitted form, EAFD readily leaches heavy metals when wet, producing heavy metals concentrations in a leachate which exceed certain limits as set forth by the United States Environmental Protection Agency (EPA). In fact, EAFD is designated hazardous by the EPA and carries the designation of "KO61" as a hazardous material because of the presence of relatively high amounts of leachable heavy metals, such as lead, chromium, cadmium, and thallium. The disposal, transportation, and handling of hazardous materials are more expensive than the disposal, transportation, and handling of non-hazardous materials. EAFD is generally considered one of the more difficult EPA-listed wastes to treat.

The current state of the art for the treatment and disposal of EAFD is either high temperature processing or chemical stabilization/fixation. For technical and economic reasons, the chemical stabilization/fixation treatment is growing rapidly in use and was performed on over one-third of the approximately 875,000 tons of EAFD generated in 1999 in the United States.

There are two sets of standards currently in use by the EPA for land disposal of EAFD; one standard is for placement in secure landfills (land disposal regulations (LDR)), and the second set is for converting the EAFD to a non-hazardous material for placement in a conventional municipal landfill ("delisting"). The current (1998) limits established as LDR are based on the EPA's SW846 Method 1311, the well-known Toxicity Characteristic Leaching Procedure (TCLP). This protocol involves exposing the material to be tested to an acetic acid solution (at a pH of 2.88) for eighteen (plus or minus two) hours. Recent discussions have indicated that the EPA may be considering additional leaching tests at other pH levels, including higher pH levels.

Delisting protocol for many years required testing by TCLP followed by the Multiple Extraction Procedure (MEP). This procedure is a nine cycle sequence of leaching in a pH 3.00 sulfuric and nitric acid fluid of the solids filtered from the TCLP. This test has been deemed equivalent to exposure to 1,000 years of acid rainfall. For many years, the EPA his discussed the technical weakness of this protocol, emphasizing the unrealistic pH levels used. Very recent petitions for delisting treated hazardous wastes, at the federal level and in U.S. EPA Regions V and VI, have been required to provide testing data for TCLP and MEP tests carried out at leaching fluid pH levels of from 2.88 to as alkaline as pH 12.

In response to each petition filed with the EPA for delisting, the EPA sets limits of heavy metals concentration specific to that petition. The particular limits vary from petition to petition depending on a number of factors. For example, for a delisting petition filed by a company related to the assignee, the EPA granted the petition and set forth the limits shown on Table 1 as generic delisting limits (GDL).

As mentioned above, an EAFD sample undergoing the TCLP must yield a result which is less than the concentration limit specified by the EPA as its Land Disposal Regulations (LDR) in order for the material to be disposed of in a secure landfill. As can be seen in Table 1, the LDRs include thirteen metals. In order to "delist" or reclassify EAFD as non-hazardous according to this granted petition, the sequential testing on a treated waste is the TCLP followed by the nine MEP cycles all on a single sample. Delisting under the above-mentioned granted petition requires that the metals concentrations of fourteen various metals (i.e., the thirteen in the LDR plus vanadium) in a leachate be below specified generic delisting limits (GDLs), as set forth in Table 1. It should be pointed out that there is some benefit or usefulness event for any reduction in heavy metals concentration, even if one or more of the metals concentration exceeds these specific limits.

TABLE 1

| | GDL | LDR |
|---|---|---|
| Antimony | 0.06 mg/L | 1.15 mg/L |
| Arsenic | 0.50 mg/L | 5 mg/L |
| Barium | 7.6 mg/L | 21 mg/L |
| Beryllium | 0.010 mg/L | 1.22 mg/L |
| Cadmium | 0.050 mg/L | 0.11 mg/L |
| Chromium | 0.33 mg/L | 0.6 mg/L |
| Lead | 0.15 mg/L | 0.75 mg/L |
| Mercury | 0.009 mg/L | 0.025 mg/L |
| Nickel | 1 mg/L | 11 mg/L |
| Selenium | 0.16 mg/L | 5.7 mg/L |
| Silver | 0.30 mg/L | 0.14 mg/L |
| Thallium | 0.020 mg/L | 0.2 mg/L |
| Vanadium | 2 mg/L | |
| Zinc | 70 mg/L | 4.3 mg/L |

Both of the tests described above are primarily directed to testing EAFD exposure under acid conditions for the purpose of simulating acid rain conditions. As mentioned above, the EPA has recently begun open discussions directed to the utilization of extraction fluids having a pH above 3.0 for the purpose of heavy metal testing and has recently proposed to grant a delisting petition using other levels, including pH values of approximately neutral and strongly alkaline. The Synthetic Precipitation Leaching Procedure (SPLP) protocol has a fluid pH of 4.2 which is obtained by the addition of sulfuric and nitric acids to water. Moreover, government agencies in Europe and Canada, as well as the American Society for Testing of Materials and the State of California, have developed aqueous leaching tests which are directed to the testing of materials at neutral pH conditions.

Several methods of chemically stabilizing EAFD have been disclosed. For example, U.S. Pat. Nos. 4,840,671 and 4,911,757, entitled PROCESS FOR CHEMICAL STABILIZATION OF HEAVY METAL BEARING DUSTS AND SLUDGES and issued to Lynn et al., disclose methods and mixtures for stabilizing EAFD and similar dusts with fly ash, lime, and water, among other ingredients. These methods partially rely on the pozzolanic characteristics of fly ash to physically entrap the hazardous constituents of EAFD within a cementitiously hardened product.

U.S. Pat. No. 5,245,122, entitled METHOD AND MIXTURE FOR TREATING ELECTRIC ARC FURNACE DUST, discloses a method for chemically stabilizing a hazardous waste composition containing EAFD by utilizing the pozzolanic characteristics of EAFD. This method involves forming a mixture of EAFD with water and lime and, optionally, ferrous sulfate. The freshly blended product has acceptable leachate concentrations when tested by the TCLP protocol. The method disclosed in the '122 patent minimizes the concentration of certain heavy metals in the leachate from the freshly blended product, even before the mixture cementitiously hardens. U.S. Pat. No. 5,569,152, entitled BUFFERING OF CEMENTITIOUS HAZARDOUS WASTE COMPOSITIONS CONTAINING ELECTRIC ARC FURNACE DUST, specifies the use of dolomitic lime as a pH-controlling agent for a hazardous waste composition including EAFD. The leachate concentrations of heavy metals from EAFD for this method also passed the TCLP protocol.

All of the known methods for trapping heavy metals from EAFD mentioned in the cited patents are primarily, although not necessarily, directed to exposure of EAFD mixtures to acid solutions.

SUMMARY OF THE INVENTION

The present invention provides a method and a composition for treating electric arc furnace dust (EAFD). The composition for reducing the solubility of heavy metals from EAFD includes a mixture of EAFD, water, and potassium magnesium sulfate, wherein the mixture further comprises lime from at least one of inherent lime from the EAFD and added lime. In an alternative embodiment, the composition may consist of a mixture of EAFD, water, a magnesium salt selected from the group consisting of magnesium sulfate and magnesium chloride, along with either inherent and/or added lime. According to either embodiment, the composition may also include ferrous sulfate.

The method of the present invention includes forming a mixture of a composition as described above, and then allowing the constituents to react to form a product with acceptable leachate properties. As will be described below, this reaction occurs almost immediately so that heavy metal concentration from a leachate is reduced even in the freshly blended materials, well before the formation of a cementitiously hardened product.

It is to be understood that both the foregoing general description and the following detailed description are exemplary, but are not restrictive, of the invention.

DETAILED DESCRIPTION OF THE INVENTION

In a first embodiment, the present invention utilizes potassium magnesium sulfate as a supplemental agent in a mixture of EAFD and water, along either inherent and/or added lime, to reduce the amount of heavy metals in a leachate resulting from fluid extraction by either acidic, neutral, or alkaline aqueous extraction solutions. According to another embodiment of the invention, a magnesium salt selected from either magnesium chloride or magnesium sulfate is used as the supplemental agent in the chemical stabilization of EAFD.

As discussed above, EAFD is defined as the solid matter emitted from an electric arc furnace. As previously stated, these emissions occur during various phases of the operation of an electric arc furnace including:

(1) the charging of scrap;

(2) the tapping of furnaces;

(3) the pneumatic injection of additives;

(4) oxygen blowing; and (5) meltdown/refining periods.

EAFD is the dust removed during any one of the above operations or a collection from any combination thereof. EAFD may be collected as a dry waste or wet, as a sludge. In its emitted form, heavy metals readily leach from EAFD when wet, producing heavy metals concentrations in leachates which often exceed the LDR limits as set forth by the EPA.

In determining the concentration of EAFD in the wet mass, it is desirable to have as much EAFD present in the mass without resulting in a leachate which exceeds certain limits, such as the EPA's LDR, or more preferably GDL, limits as set forth in Table 1. As discussed above, however, these limits, may be revised by the EPA over time and depend upon a number of factors. In addition, the limits are expected to be different for each delisting petition. Thus, the limits set forth in Table 1, although arbitrarily set as a preferred goal in this application, may not be the limits provided by the EPA in subsequently granted petitions. By treating as much EAFD as possible, the total volume of waste is minimized. Therefore, the amount of EAFD added will vary based on a number of factors, including the limits of metals concentration being sought. In an embodiment using a particular EAFD source and using the limits set forth in Table 1 as the desired goal, the concentration of EAFD in the wet mass to be stabilized may be within the range of about 59 to about 82%. (Unless otherwise indicated, all percentages herein will be given as a wet weight basis, i.e., the weight of the constituent divided by the total weight of the mixture, including the weight of any water, but excluding the weight of the supplemental agent, such as potassium magnesium sulfate or a magnesium salt.) Preferably in this scenario, the concentration of EAFD is within about 63 to about 76%.

Preferably, the EAFD used in the present invention has minimal variations between sources generating the EAFD and minimal variations over time within individual sources. Preferably, the EAFD is selected from a single source and/or is well-mixed.

The composition also includes water in an amount sufficient to react with the EAFD. The amount of water could be easily determined by one skilled in the art by balancing the following factors: (1) having enough water for the chemical reactions to occur; (2) permitting some level of compaction to occur; and (3) controlling the dust from escaping the reaction area. For example, an EAFD which has very fine particles might require more water to control the dust. In addition, the upper limit on water addition in the United States is restricted based on a ban, imposed by the EPA, on water bleeding from the treated waste, as measured by a paint filter test. In one embodiment, the sludge only need include about 16 to about 23% water (wet weight basis, i.e. weight of water divided by the total wet weight of the mixture, excluding the weight of the supplemental agent). The preferred water content in one embodiment is about 18 to about 20%. As with the discussion of the amount of EAFD to be added, the amount of water to be added depends on a number of factors, including the limits set by the EPA which may vary over time and in different circumstances. This holds true for the other constituents discussed below.

Lime is also used in the present invention. Any type of lime, as described in U.S. Pat. Nos. 5,245,122 and 5,569,152, incorporated herein by reference, can be used in connection with the present invention. Dolomitic lime is preferred. As used herein, the term "lime" shall refer only to "available lime" as defined in the '122 patent and shall exclude forms of calcium which are not available for reaction, such as limestone. The term "lime" shall usually mean the total available lime, including the lime already present in the EAFD ("inherent lime") and lime which is added for the reaction ("added lime"). The amount of lime added to a composition, however, shall be calculated on the same wet weight basis as described above (i.e., weight of lime added (e.g., quicklime, dolomitic monohydrate, etc.) divided by the total wet weight of the mixture, excluding the weight of the supplemental agent.

Some EAFD samples have a sufficient amount of inherent lime therein such that no additional need be added. The primary indicator as to whether any lime must be added is the pH of the leachate from the TCLP. In particular, if this pH is below 9.4, then the mixture should be evaluated for possible lime increase while if it is above 10.2, the mixture should be evaluated for possible lime decrease, such as by neutralization through the addition of ferrous sulfate or some other conventional neutralization technique. If the leachate pH is between 9.4 and 10.2, then no lime need be added in many cases. The desired lime content of the EAFD mixture will vary based on the content of lime inherent in the EAFD, the need for ferrous sulfate, and the supplemental agent used. In EAFD mixtures from most sources, the sufficient lime should be added to achieve a total lime content of between about 2 and 7 wet weight percent in many cases and, preferably 3 to 4%, although these values may vary depending on the conditions, including the desired limits or limits set by the EPA. In general, if lead is leaching at high levels, too much lime was added, while if cadmium or zinc is leaching at too high levels, not enough lime was added. It should also be pointed out that different forms of lime have different molecular weights, and the preferred percentages will vary accordingly. The general ranges provides above are primarily for dolomitic monohydrated lime.

In an optional embodiment of the invention, the lime added to the EAFD mixture is dolomitic lime, which, as defined in the '152 patent, indicates the presence of magnesium in additional to calcium. When dolomitic lime is selected as the added lime, the amount of dolomitic lime added to the mixture of EAFD will vary with the amount of supplemental agent to be used. More specifically, it should be noted that it is the magnesium in the supplemental agents of the present invention that primarily provide the desired effect. Accordingly, when dolomitic lime is selected as the added lime, a corresponding decrease in the amount of magnesium provided by the added supplemental agent is made to achieve the same effect if the full amount of supplemental agent is added when calcitic lime is selected. As can be appreciated, the reduction in supplemental agent when dolomitic lime is selected will vary but not in a consistent manner because the various supplemental agents of the present invention contain differing amounts of magnesium. In particular, potassium magnesium sulfate contains 8% magnesium, Epsom salts contain 10% magnesium, and magnesium chloride heptahydrate contains 12% magnesium. Dolomitic monohydrate (N) contains about 21% magnesium. One skilled in the art could easily determine the amount of supplemental agent which should be reduced if dolomitic lime is selected. It should be noted that the amount of lime to be added cannot be varied too much, as it is the lime that contains calcium oxide, which is strongly alkaline and helps to attain the desired pH.

Optionally, ferrous sulfate may be added to the mixture. Ferrous sulfate is added to the mixture based on the heavy metal analysis of the EAFD prior to mixing. It is believed that ferrous sulfate serves to reduce hexavalent chromium to trivalent chromium. Trivalent chromium is less soluble than hexavalent chromium and is thus less likely to leach from the cementitiously hardened product. Also, ferrous sulfate assists in the formation of lead sulfate ($PbSO_4$), a less soluble form of lead. Because of this dual role of ferrous sulfate in immobilizing chromium and lead, it is widely used in many compositions. Use of either potassium magnesium sulfate or magnesium sulfate as the supplemental agent will provide the sulfate ion for lead immobilization but not the iron for chromium reduction and subsequent immobilization. While EAFD sources may typically contain insignificant quantities of lead and/or chromium, variability in the quality of scrap metal used in electric furnace steel production makes it advisable to include ferrous sulfate as a safety factor in formulation.

The desired amount of ferrous sulfate is determined easily by one skilled in the art by assessing the effect of ferrous sulfate on chromium and lead concentration of the leachate. Once again, the amount of ferrous sulfate will vary over a wide range based on many factors, including the desired or set limits. In one embodiment, ferrous sulfate may be added in a range of from about 0.5 to about 3.5%. Ferrous sulfate may be added in crystalline form or as a solution thereof. As described previously, the heavy metal content of the EAFD is analyzed prior to mixing; accordingly, no ferrous sulfate would be needed if it was determined that the waste (and the source scrap metal) includes little or no hexavalent chromium or soluble lead or if the amount of lead could be stabilized by selecting potassium magnesium sulfate or magnesium sulfate as the supplemental agent.

Another additive according to a first embodiment of the present invention is potassium magnesium sulfate, which serves as a supplemental agent in both acidic and alkaline environments. As used herein, the term "potassium magnesium sulfate" refers to a compound which includes potassium, magnesium, and sulfate, which may either be hydrated or anhydrous, and which is normally crystalline. Some exemplary potassium magnesium sulfates are langbeinite ($K_2SO_4.2MgSO_4$), leonite ($K_2Mg(SO_4)_2.4H_2O$), and picromerite ($K_2Mg(SO_4)_2.6H_2O$), with langbeinite being most preferable.

As an alternative to the first embodiment, other magnesium salts have also been found to be effective supplemental agents in a mixture of EAFD, water, and lime. These salts include magnesium sulfate and magnesium chloride. Any known commercially available grades of these magnesium salts may be used, and they may be hydrated or anhydrous. For example, epsom salt, a hydrated form of magnesium sulfate ($MgSO_4.7H_2O$), can be used as the magnesium salt.

Yet another optional additive is fly ash. Fly ash is the fine ash produced by the combustion of powdered coal. It does not appear that fly ash plays a significant role in this invention and, if added, may be added in a range of about 1% to about 6% (by weight) in one embodiment.

The composition of the present invention results in reduced heavy metals concentrations of a leachate of the composition following either the EPA's Toxicity Characteristic Leaching Procedure (TCLP), the Multiple Extraction Procedure (MEP), and the Synthetic Precipitation Leaching Procedure (SPLP), as well as when the aqueous extraction solution is non-acidic, such as at neutral pH or above. This indicates that the invention will perform well in both acid rain and alkaline conditions. In addition, this invention has the potential to retain heavy metals under basic extraction conditions, demonstrating that it will retain heavy metals when the mixture is exposed to alkali soil conditions. In this application, the term "aqueous leaching test" refers to the EPA defined protocols discussed above, leaching tests performed at neutral pH, leaching tests performed at basic pH, and any other leaching protocol in which mixtures or products are contacted with water for the purpose of measuring the composition of the leachate. "Aqueous extraction solution" refers to any solution with a water base and used to extract heavy metals from an EAFD mixture. Because the pH of distilled water can vary in the laboratory setting depending on distillation techniques and water supply, the "neutral pH" of water is considered to be within the range of 5.5 to 7.0 for the purpose of this application.

In the past, EAFD mixtures which are buffered to maintain a pH within the range of 9.4 to 10.2 have been found to retain the heavy metals when soaked in aqueous extraction solutions having a pH of about 3.0. Several mixtures of EAFD have been shown to maintain a pH within this range when placed in contact with aqueous extraction solutions of acidic pH, but do not demonstrate such characteristics when placed in contact with acidic solutions with a pH higher than 3.0 or with water. The present invention demonstrates that the use of potassium magnesium sulfate or magnesium salts as supplemental agents in a mixture of EAFD, lime, and water either: (1) maintains the mixtures' pH within the 9.4 to 10.2 range when the mixture is exposed to both acid and non-acid aqueous solutions; or (2) nonetheless minimizes the leaching of heavy metals even if the mixture is outside of this range.

As mentioned above, the amount of EAFD, water, lime, and ferrous sulfate in the mixture is generally given as a weight percent basis, i.e. weight of constituent divided by total weight of the mixture, excluding the weight of the supplemental agent. The weight percent of supplemental agent is calculated as a percent of the total weight of EAFD, water, added lime, and any ferrous sulfate or other additives but excluding the weight of the supplemental agent itself. For example, a weight percent of 25% of supplemental agent would indicate 25 grams of supplemental agent in 100 grams of EAFD, water, and added lime (with optional ferrous sulfate). This weight percentage shall be characterized herein as an "incremental weight percent". The amount of supplemental agent used varies over a wide range and depends on the particulars of the EAFD being treated, the type of lime used, and the desired extent of reduction in heavy metals concentration, among other factors. In general, the amount of supplemental agent required is that which tends to achieve a pH of a leachate between about 9.4 and 10.2 from any aqueous leaching test, although this is not necessary in all cases. A preferred range of supplemental agent is between 5 and 30% supplemental agent (as an incremental weight percent), and a more preferred range is between 6 and 20%, with a most preferred range between 8 and 15%.

Prior to mixing the EAFD with the other components of the invention, the heavy metal and calcium oxide concentrations of the EAFD are tested. If significant deviations in calcium oxide concentrations are detected in the EAFD, based on a comparison with historical measurements, then the weight percent of lime or EAFD concentrations in the final mixture will be adjusted. In particular according to one approach, with a new sample of EAFD, the amounts of ferrous sulfate and water are fixed based on the amount of chromium and lead levels in the stream. Next, the amount of lime to be added is determined, typically by empirical testing with the goal primarily to achieve the leachate pH to within the desired range of 9.4 to 10.2. As mentioned above, the amount of lime to be added is a function of the available lime inherent in the EAFD and varies among EAFD sources. In some cases, it has been found that the amount of lime to be added is not reduced in a one to one ratio based on the amount of available lime inherent in the EAFD but instead the amount of lime to be added might be reduced in a greater than one to one ratio, such as 1.5:1. Thus, in these cases, with a reduction of one percent of available lime inherent in the EAFD, the amount of dolomitic monohydrated lime to be added is reduced by 1.5%. Part of this is due to the difference in molecular weight of the two types of lime per CaO equivalent. The amount of calcium present in the water used to form the mixture is also routinely tested but has been found to have little or no effect on the ability of the final product to retain heavy metals upon leaching or upon the weight percent of the individual components in the mixture needed to achieve the desired quality of the mixture.

The order of addition of the constituents does not appear to be critical. For example, the constituents (i.e., EAFD, water, lime (if any added), the supplemental agent, and, optionally, ferrous sulfate) may be added together simultaneously or may be premixed in any combination. It is not believed that any intermediates between two or three of the constituents are formed which are critical to the operation of the composition and method of the present invention. In one embodiment, the order of addition is to blend the dry ingredients (i.e., EAFD, lime (if any added), the supplemental agent, and, optionally, ferrous sulfate) well, then add water, to ease the mixing effort. (It should be noted that although lime, the supplemental agent, and ferrous sulfate are referred to as "dry," they may be added in a hydrated form, as contemplated above.)

In addition, the manner of mixing the materials is not important and any conventional means can be used to attain a well-mixed composition. For example, EAFD mixtures are mixed by adding the EAFD, water, lime (if any added), the supplemental agent, and optional ferrous sulfate in a container large enough to accommodate all components. For instance, approximately 40 tons of material can be placed in a large mixing vessel with a back hoe attached. The wet sludge is then mixed for 30 minutes or until the mixture is adequately homogeneous.

The process steps of the present invention, namely forming the mixture and permitting it to undergo the initial chemical reactions which occur almost immediately, can be carried out in a known manner. The only qualification to the first step is that the constituents be well mixed. The step of permitting the mixture to react to form a product having a decreased heavy metal concentration in a leachate is accomplished almost immediately by chemical reactions. Thus, shortly after the mixture is formed, the heavy metals concentration in a leachate is "reduced" in that the heavy metals concentration in a leachate of the mixture is less than the concentration of a leachate of EAFD if it were simply diluted with inert additives. The "leachate" can be that formed by any of the aqueous leaching tests discussed herein, which involve washing the mixture with an acidic or alkaline aqueous leaching solution.

Even immediately after mixing, the mixture of the present invention typically has reduced leachate characteristics, more preferably, below the EPA's LDRs, after undergoing the EPA's TCLP, MEP, SPLP, and aqueous leaching tests using alkaline aqueous leaching solutions. Most preferably, the mixture of the present invention has leachate characteristics below the EPA's GDLs, after undergoing any of these aqueous leaching tests.

After mixing the constituents, the mixture may be permitted to react (or cure) to form a cementitiously hardened product. The reaction may be accomplished, for example, by permitting the mixture to react for seven days at 100° F. More commonly, field curing time, equivalent to seven days at 100° F., is used. For example, sixty days at 50° F. has also been deemed equivalent. A typical field curing time is thirty days at 73° F. The experiments reported in the examples below were not permitted to react prior to being subjected to the leaching procedures. Formulations according to the present invention are designed to produce a composition that can be sampled and tested immediately after blending, long before pozzolanic chemistry can contribute to immobilization.

The present invention and the effect of varying the composition of the mixture are more clearly demonstrated by the following examples. The following examples are included to more clearly demonstrate the overall nature of the invention. The examples are exemplary, not restrictive, of the invention.

EXAMPLES

In the examples, various samples of the same EAFD were mixed with combinations of dolomitic monohydrated lime, a commercial product consisting of calcium hydroxide and magnesium oxide in an approximate one to one molecular ratio (referred to as "N-lime" below), water, ferrous sulfate, and a supplemental agent of the present invention. The final TCLP pH value was determined in accordance with the EPA Toxicity Characteristic Leaching Procedure (TCLP), method 1311, Revision O, July 1992, which is incorporated herein by reference. In summary, this procedure involves agitating the waste composition, immediately after the compositions are inter-blended, for 18±2 hours while exposing the composition to an acetic acid solution. After this period of agitation and exposure to acid, the leachate is then analyzed for metals content and the pH of the EAFD mixture is assessed. The final SPLP and water pH values were determined in a similar fashion; however, the aqueous extraction solutions used had either a pH of 4.2, achieved by the addition of sulfuric and nitric acid to water, or 5.5 to 7.0, that of distilled water, or 12, achieved by the addition of sodium hydroxide to water.

Example 1

All of the mixtures presented in this examples demonstrated heavy metal concentrations in both TCLP and SPLP aqueous leaching solutions that were within the acceptable limits for the LDR. pH values presented in Table 2 represent the pH value of the EAFD mixture after exposure to the respective aqueous leaching solution. Although some EAFD mixtures has pH values outside the 9.4 to 10.2 range, these mixtures still demonstrated acceptable retention of heavy metals in the mixture when exposed to both aqueous leaching solutions.

TABLE 2

SUCCESSFUL EXPERIMENTAL ACID/WATER LEACHING FORMULATIONS (MET LDR REGULATORY LIMITS)

| | | | | | | pH of EAFD Mixture[a] | | |
|---|---|---|---|---|---|---|---|---|
| EAFD (%) | N-LIME (%) | FeSO4 (%) | WATER (%) | ADDITIVE | ADDITIVE (100% + %) | POST-TCLP PH[b] | POST-SPLP LEACH pH[c] | POST-WATER LEACH pH |
| 73 | 4 | 3 | 20 | $MgSO_47H_2O$ | 25 | 9.40 | NOT RUN | 9.85 |
| 78 | 3 | 1 | 18 | $MgSO_47H_2O$ | 25 | 9.40 | 10.00 | 9.95 |
| 78 | 3 | 1 | 18 | $MgSO_47H_2O$ | 15 | 9.50 | 11.35 | 11.35 |
| 78 | 3 | 1 | 18 | $MgSO_47H_2O$ | 20 | 9.40 | 10.20 | 10.25 |
| 73 | 4 | 3 | 20 | $MgCl_2.6H_2O$ | 20 | 9.35 | NOT RUN | 10.35 |
| 78 | 3 | 1 | 18 | $K_2SO_4/MgSO_4$ | 15 | 9.50 | 10.60 | 11.00 |
| 78 | 3 | 1 | 18 | $K_2SO_4/MgSO_4$ | 20 | 9.85 | 10.10 | 10.10 |
| 75 | 4 | 3 | 18 | $K_2SO_4/MgSO_4$ | 20 | 9.10 | 10.00 | 10.10 |

[a]pH values presented represent the pH of the EAFD mixture after exposure to each respective aqueous leaching solution.
[b]pH = 2.88
[c]pH = 4.2

It should be noted that additional tests were conducted whose leachates did not meet the LDR limits established by the EPA. For example, samples using Epsom salt similar to those reported except that an additive percentage of ten percent did not meet the limits. In addition, samples of magnesium chloride at five and ten percent as samples of potassium magnesium sulfate at five and ten percent did not meet the LDR limits. Nonetheless, these samples all showed some reduction of heavy metals content in the leachate from all three aqueous leaching tests over a control in which none of the additive was included. Moreover, a lower concentration of the additive be used if EAFD from a different source, having less of a heavy metal content, used.

Example 2

A sample collected from a source of EAFD was used. As in the initial study the sample used was mixed thoroughly using hand, a Hobart planetary mixer, and tumbling methods to ensure homogeneity. The resulting mix design for this sample is as follows:

18% Water (Site Specific—Pond)

1.5% Ferrous Sulfate Heptahydrate (Site Specific—Plant)

6.0% N-Lime (Site Specific—Plant) 74.5% Waste (S)

For this mix design, 500 g of waste was used. Current plant ferrous sulfate and lime were added in appropriate proportions. This treated load was mixed in the Hobart planetary mixer for 5 minutes and three samples were weighed out and extracted (TCLP) using Extraction Fluid 2 (pH=2.88, acidified by the addition acetic acid), Extraction Fluid 8 (pH=8.03, rendered basic by the addition of sodium hydroxide), and Extraction Fluid 12 (pH=12.00, also rendered basic by the addition of sodium hydroxide). The remaining treated load received potassium magnesium sulfate, $K_2SO_4/MgSO_4$ (labeled "Additive X" in the tables below) in the incremental weight percents specified (100% Treated load: 25% Additive X). Three samples were weighed out and extracted (TCLP) using Extraction Fluids 2, 8, and 12. All TCLP were extracted for 16 hours, filtered, and digested using an inductively coupled plasma analyzer "ICP" for quantitative analysis of twelve metals (i.e., Sb, As, Ba, Be, Cd, Cr, Pb, Ni, Se, Ag, Tl, and Zn) and a separate Hg analysis. The results are as follows:

TABLE 3

| Sample Identity | Extraction Fluid | TCLP pH | Hg | ICP |
|---|---|---|---|---|
| Treated Load-No Additive X | Extraction Fluid 2 | 9.79 | P | F(Zn) |
| Treated Load-No Additive X | Extraction Fluid 8 | 12.37 | P | F(Pb) |
| Treated Load-With Additive X | Extraction Fluid 2 | 9.30 | P | P |
| Treated Load-With Additive X | Extraction Fluid 8 | 10.26 | P | P |
| Treated Load-With Additive X | Extraction Fluid 12 | 10.30 | P | P |

In Table 3, a "P" indicates that all thirteen of the metals tested had a concentration below the LDRs set forth in Table 1. An "F" indicates that the concentrations were above these limits, but, in each case, there was some reduction in concentration compared with untreated EAFD. Referring to Table 3, the treated load with no addition of potassium magnesium sulfate and extracted using Extraction Fluid 2 produced a pH of 9.79. Analytical data showed a failure. This pH value may be an outlier. It seems reasonable to expect that a mix design that uses an additional 1.5% N-Lime over what the original mix calls for may fail. Despite this result, the addition of 6.0% total of N-Lime and 25% Additive potassium magnesium sulfate will result in an analytical pass according to present limits.

Example 3

In another study, the original mix design for the same EAFD source was used and the potassium magnesium sulfate additive ratio was varied from the original 25%. The resultant mix design is:

18% Water (Site Specific—Pond)

1.5% Ferrous Sulfate Heptahydrate (Site Specific—Plant)

4.5% N-Lime (Site Specific—Plant)

76% Waste (S)

20 or 22.5% potassium magnesium sulfate "Additive X" Addition

TABLE 4

| Sample Identity | Extraction Fluid | TCLP pH | Hg | ICP |
|---|---|---|---|---|
| Treated Load-No Additive X | Extraction Fluid 2 | 9.56 | P | P |
| Treated Load-No Additive X | Extraction Fluid 8 | 12.37 | P | F(Pb) |
| Treated Load-With Additive X (20%) | Extraction Fluid 2 | 7.63 | P | F(Cd,Zn) |
| Treated Load-With Additive X (20%) | Extraction Fluid 8 | 10.20 | P | P |
| Treated Load-With Additive X (22.5%) | Extraction Fluid 2 | 8.84 | P | P |
| Treated Load-With Additive X (22.5%) | Extraction Fluid 8 | 10.48 | P | P |

In the third study, not enough lime and/or additive was used, as the pH was only 7.63 and the ICP test showed amounts of lead and zinc above the LDR limits set forth in Table 1, but some reduction in these metals over untreated EAFD.

Example 4

A sample from the same source of EAFD was collected. As in the initial study, the sample used was mixed thoroughly using hand, Hobart, and tumbling methods to ensure homogeneity. The resulting mix design for this sample is as follows:

18% Water (Site Specific—Pond)

1.5% Ferrous Sulfate Heptahydrate (Site Specific—Plant)

5.0 and 5.5% N-Lime (Site Specific—Plant)

75.5 and 75.0% Waste (S)

For this mix design, 500 g of waste was used. Current plant ferrous and lime were added in appropriate proportions. This treated load was mixed in the Hobart planetary mixer for 5 minutes and two samples were weighed out and extracted (TCLP) using Extraction Fluid 2 (pH=2.88) and Extraction Fluid 8 (pH=8.02). The remaining treated load received an incremental weight percent of potassium magnesium sulfate "Additive X" in the proportions specified (100% Treated load: 22.5% Additive X). Two samples were weighed out and extracted (TCLP) using Extraction Fluid 2 and 8. All TCLP were extracted for 16 hours, filtered, and digested for ICP and Hg analysis. The results are as follows:

TABLE 5

| Sample Identity | Extraction Fluid | TCLP pH | Hg | ICP |
|---|---|---|---|---|
| Treated Load-No Additive X (5.0% N-Lime) | Extraction Fluid 2 | 9.75 | P | P |
| Treated Load-No Additive X (5.0% N-Lime) | Extraction Fluid 8 | 12.73 | P | F(Pb) |

TABLE 5-continued

| Sample Identity | Extraction Fluid | TCLP pH | Hg | ICP |
|---|---|---|---|---|
| Treated Load-No Additive X (5.5% N-Lime) | Extraction Fluid 2 | 9.90 | P | P |
| Treated Load-No Additive X (5.5% N-Lime) | Extraction Fluid 8 | 12.74 | P | F(Pb) |
| Treated Load-With Additive X (5.0% N-Lime) | Extraction Fluid 2 | 7.57 | P | F(Cd,Zn) |
| Treated Load-With Additive X (5.0% N-Lime) | Extraction Fluid 8 | 10.38 | P | P |
| Treated Load-With Additive X (5.5% N-Lime) | Extraction Fluid 2 | 8.47 | P | P |
| Treated Load-With Additive X (5.5% N-Lime) | Extraction Fluid 8 | 10.42 | P | P |

The addition of 5.0% total of N-Lime and 22.5% potassium magnesium sulfate has resulted in a concentration of cadmium and zinc for this EAFD source above the LDR values of Table 1, but did show some reduction compared to untreated EAFD. (It should be noted that an EAFD with less cadmium and zinc would pass under the same conditions otherwise.) The addition of 5.5% N-Lime with and 22.5% potassium magnesium sulfate has resulted in an analytical pass. From the previous study, the addition of 4.5% N-Lime and 22.5% potassium magnesium sulfate has resulted in an analytical pass. The discontinuous nature of the 5.0% N-Lime addition may be an outlier.

Example 5

A sample from the same source of EAFD was collected. As in the initial study, the sample used was mixed thoroughly using hand, Hobart, and tumbling methods to ensure homogeneity. The resulting mix designs for this sample are as follows:

18% Water (Site Specific—Pond)

1.5% Ferrous Sulfate Heptahydrate (Site Specific—Plant)

5.0 and 5.5% N-Lime (Site Specific—Plant)

75.5 and 75.0% Waste (S)

25% Additive X

For this mix design, 500 g of waste was used. Current plant ferrous sulfate and lime were added along with the other constituents listed above in appropriate proportions. This treated load was mixed in the Hobart planetary mixer for 5 minutes and three samples were weighed out and extracted (TCLP) using Extraction Fluid 2 (pH=2.88), Extraction Fluid 8 (pH=8.02), and Extraction Fluid 12 (pH=12.00). All TCLP samples were extracted for 16 hours, filtered, and digested for ICP and Hg analysis. The results are as follows:

As shown above, five of the six samples tested passed for all thirteen metals, meaning that their concentrations in the leachates over the range of extracting fluids were below those set forth as the LDR values in Table 1. Only the sample with the addition of 5.0% total of N-Lime and 25% potassium magnesium sulfate resulted in a concentration of cadmium and zinc for this EAFD source above the LDR values of Table 1, but this sample did show some reduction compared to untreated EAFD. (It should be noted that an EAFD with less cadmium and zinc would pass under the same conditions otherwise.)

Example 6

A sample from the same source of EAFD was collected. As in the initial study, the sample used was mixed thoroughly using hand, Hobart, and tumbling methods to ensure homogeneity. The resulting mix design for this sample is as follows:

14.4% Water (Site Specific—Pond)

1.7% Ferrous Sulfate Heptahydrate (Site Specific—Plant)

5.2% N-Lime (Site Specific—Plant)

78.7% Waste (S)

8.0% Additive X

For this mix design, 500 g of waste was used. Current plant ferrous sulfate and lime were added along with the other consitituents listed above in appropriate proportions. This treated load was mixed in the Hobart planetary mixer for 5 minutes and three samples were weighed out and extracted (TCLP) using Extraction Fluid 2 (pH=2.88), Extraction Fluid 10 (pH=10.00), and Extraction Fluid 12 (pH=12.00). All TCLP samples were extracted for 16 hours, filtered, and digested for ICP and Hg analysis. The results are as follows:

TABLE 6

| Sample Identity | Extraction Fluid | TCLP pH | Hg | ICP |
|---|---|---|---|---|
| Treated Load-With Additive X (5.0% N-Lime) | Extraction Fluid 2 | 7.21 | P | F(Cd,Zn) |
| Treated Load-With Additive X (5.0% N-Lime) | Extraction Fluid 8 | 10.20 | P | P |
| Treated Load-With Additive X (5.0% N-Lime) | Extraction Fluid 12 | 10.28 | P | P |
| Treated Load-With Additive X (5.5% N-Lime) | Extraction Fluid 2 | 8.93 | P | P |
| Treated Load-With Additive X (5.5% N-Lime) | Extraction Fluid 8 | 10.25 | P | P |
| Treated Load-With Additive X (5.5% N-Lime) | Extraction Fluid 12 | 10.35 | P | P |

TABLE 7

| Sample Identity | Extraction Fluid | TCLP pH | Hg | ICP |
|---|---|---|---|---|
| Treated Load-With Additive X | Extraction Fluid 2 | 8.74 | P | P |
| Treated Load-With Additive X | Extraction Fluid 10 | 10.16 | P | P |
| Treated Load-With Additive X | Extraction Fluid 12 | 10.31 | P | P |

As shown above, all three of the samples tested passed for all thirteen metals, meaning that their concentrations in the leachates over the range of extracting fluids were below those set forth as the LDR values in Table 1. It is interesting to note that the sample extracted by Extracting Fluid 12 passed even though its TCLP pH of 10.31 is outside of the preferred range of 9.4 to 10.2.

Although illustrated and described herein with reference to certain specific embodiments and examples, the present invention is nevertheless not intended to be limited to the details shown. Rather, various modifications may be made in the details within the scope and range of equivalents of the claims and without departing from the spirit of the invention.

What is claimed is:

1. A composition for reducing the solubility of heavy metals in EAM comprising a mixture of said EAFD, water, and potassium magnesium sulfate, wherein said mixture further comprises lime from at least one of the group consisting of inherent lime from said EAFD and added lime, wherein a leachate, formed by exposing the composition to an alkaline aqueous extraction solution, has decreased concentrations of heavy metals.

2. The composition of claim 1, wherein:

(a) the concentration of said EAFD is about 59 to about 82 weight percent;

(b) the concentration of said water is about 16 to about 23 weight percent;

(c) the concentration of said potassium magnesium sulfate is about 5 to about 30 incremental weight percent; and (d) the concentration of said lime is about 2 to about 7 weight percent.

3. The composition of claim 1 further comprising ferrous sulfate.

4. The composition of claim 3, wherein:

(a) the concentration of said EAFD is about 63 to about 76 weight percent;

(b) the concentration of said water is about 18 to about 20 weight percent;

(c) the concentration of said potassium magnesium sulfate is about 6 to about 20 incremental weight percent;

(d) the concentration of said lime is about 3 to about 4 weight percent; and (e) the concentration of said ferrous sulfate is about 0.5 to about 3.5 weight percent.

5. The composition of claim 1 wherein said added lime comprises dolomitic lime.

6. The composition of claim 1, wherein the concentrations of the heavy metals in the leachate are below the following limits:

| | |
|---|---|
| Antimony | 1.15 mg/L |
| Arsenic | 5 mg/L |

-continued

| | |
|---|---|
| Barium | 21 mg/L |
| Beryllium | 1.22 mg/L |
| Cadmium | 0.11 mg/L |
| Chromium | 0.6 mg/L |
| Lead | 0.75 mg/L |
| Mercury | 0.025 mg/L |
| Nickel | 11 mg/L |
| Selenium | 5.7 mg/L |
| Silver | 0.14 mg/L |
| Thallium | 0.2 mg/L |
| zinc | 4.3 mg/L. |

7. The composition of claim 1, wherein the concentrations of the heavy metals in the leachate are below the following limits:

| | |
|---|---|
| Antimony | 0.06 mg/L |
| Arsenic | 0.50 mg/L |
| Barium | 7.6 mg/L |
| Beryllium | 0.010 mg/L |
| Cadmium | 0.050 mg/L |
| Chromium | 0.33 mg/L |
| Lead | 0.15 mg/L |
| Mercury | 0.009 mg/L |
| Nickel | 1 mg/L |
| Selenium | 0.16 mg/L |
| Silver | 0.30 mg/L |
| Thallium | 0.020 mg/L |
| Vanadium | 2 mg/L |
| Zinc | 70 mg/L. |

8. A composition of matter for reducing the solubility of heavy metals in EAFD consisting of a mixture of said EAFD, water, lime and a magnesium salt selected from the group consisting of magnesium sulfate and magnesium chloride, wherein said lime is selected from the group consisting of at least one of inherent lime from said EAFD and added lime, wherein a leachate, formed by exposing the composition to an alkaline aqueous extraction solution, has decreased concentrations of heavy metals.

9. The composition of claim 8, wherein:

(a) the concentration of said EAFD is about 59 to about 82 weight percent;

(b) the concentration of said water is about 16 to about 23 weight percent;

(c) the concentration of said magnesium salt is about 5 to about 30 incremental weight percent; and (d) the concentration of said lime is about 2 to about 7 weight percent.

10. The composition of claim 8 wherein said added lime comprises dolomitic lime.

11. The composition of claim 8 wherein said magnesium salt is magnesium sulfate.

12. The composition of claim 8 wherein said magnesium salt is magnesium chloride.

13. The composition of claim 8, wherein the concentrations of the heavy metals in the leachate are below the following limits:

| | |
|---|---|
| Antimony | 1.15 mg/L |
| Arsenic | 5 mg/L |
| Barium | 21 mg/L |
| Beryllium | 1.22 mg/L |
| Cadmium | 0.11 mg/L |

-continued

| | |
|---|---|
| Chromium | 0.6 mg/L |
| Lead | 0.75 mg/L |
| Mercury | 0.025 mg/L |
| Nickel | 11 mg/L |
| Selenium | 5.7 mg/L |
| Silver | 0.14 mg/L |
| Thallium | 0.2 mg/L |
| Zinc | 4.3 mg/L. |

14. The composition of claim 8, wherein the concentrations of the heavy metals in the leachate are below the following limits:

| | |
|---|---|
| Antimony | 0.06 mg/L |
| Arsenic | 0.50 mg/L |
| Barium | 7.6 mg/L |
| Beryllium | 0.010 mg/L |
| Cadmium | 0.050 mg/L |
| Chromium | 0.33 mg/L |
| Lead | 0.15 mg/L |
| Mercury | 0.009 mg/L |
| Nickel | 1 mg/L |
| Selenium | 0.16 mg/L |
| Silver | 0.30 mg/L |
| Thallium | 0.020 mg/L |
| Vanadium | 2 mg/L |
| Zinc | 70 mg/L. |

15. A method for treating EAFD to reduce the concentration of hazardous constituents in a leachate from said EAFD, said method comprising the steps of:

forming a mixture of said EAFD, water, and potassium magnesium sulfate, wherein said mixture further comprises lime from at least one of the group consisting of inherent lime from said EAFD and added lime; and permitting said mixture to react to form a product having a decreased concentration of heavy metals in said leachate, wherein said leachate is formed by exposing said mixture to an alkaline aqueous extraction solution.

16. The method of claim 15 further comprising curing said product to form a cementitiously hardened product.

17. The method of claim 15 further comprising adding ferrous sulfate to said mixture.

18. The method of claim 15 wherein said added lime comprises dolomitic lime.

19. The method of claim 15, wherein the concentrations of the heavy metals in the leachate are below the following limits:

| | |
|---|---|
| Antimony | 1.15 mg/L |
| Arsenic | 5 mg/L |
| Barium | 21 mg/L |
| Beryllium | 1.22 mg/L |
| Cadmium | 0.11 mg/L |
| Chromium | 0.6 mg/L |
| Lead | 0.75 mg/L |
| Mercury | 0.025 mg/L |
| Nickel | 11 mg/L |
| Selenium | 5.7 mg/L |
| Silver | 0.14 mg/L |
| Thallium | 0.2 mg/L |
| Zinc | 4.3 mg/L. |

20. The method of claim 15, wherein the concentrations of the heavy metals in the leachate are below the following limits:

| | |
|---|---|
| Antimony | 0.06 mg/L |
| Arsenic | 0.50 mg/L |
| Barium | 7.6 mg/L |
| Beryllium | 0.010 mg/L |
| Cadmium | 0.050 mg/L |
| Chromium | 0.33 mg/L |
| Lead | 0.15 mg/L |
| Mercury | 0.009 mg/L |
| Nickel | 1 mg/L |
| Selenium | 0.16 mg/L |
| Silver | 0.30 mg/L |
| Thallium | 0.020 mg/L |
| Vanadium | 2 mg/L |
| Zinc | 70 mg/L. |

21. A method for treating EAFD to reduce the concentration of hazardous constituents in a leachate from said EAFD, said method comprising the steps of:

forming a mixture consisting of said EAFD, water, lime and a magnesium salt selected from the group consisting of magnesium sulfate and magnesium chloride, wherein said lime is selected from the group consisting of at least one of inherent lime from said EAFD and added lime; and permitting said mixture to react to form a product having a decreased concentration of heavy metals in said leachate, wherein said leachate is formed by exposing said mixture to an alkaline aqueous extraction solution.

22. The method of claim 21, further comprising curing said product to form a cementitiously hardened product.

23. The method of claim 21, wherein said added lime comprises dolomitic lime.

24. The method of claim 21 further comprising adding ferrous sulfate to said mixture.

25. The method of claim 21, wherein said magnesium salt is magnesium sulfate.

26. The method of claim 21, wherein said magnesium salt is magnesium chloride.

27. The method of claim 21, wherein the concentrations of the heavy metals in the leachate are below the following limits:

| | |
|---|---|
| Antimony | 1.15 mg/L |
| Arsenic | 5 mg/L |
| Barium | 21 mg/L |
| Beryllium | 1.22 mg/L |
| Cadmium | 0.11 mg/L |
| Chromium | 0.6 mg/L |
| Lead | 0.75 mg/L |
| Mercury | 0.025 mg/L |
| Nickel | 11 mg/L |
| Selenium | 5.7 mg/L |
| Silver | 0.14 mg/L |
| Thallium | 0.2 mg/L |
| Zinc | 4.3 mg/L. |

28. The method of claim 21, wherein the concentrations of the heavy metals in the leachate are below the following limits:

| | |
|---|---|
| Antimony | 0.06 mg/L |
| Arsenic | 0.50 mg/L |
| Barium | 7.6 mg/L |
| Beryllium | 0.010 mg/L |

-continued

| | |
|---|---|
| Cadmium | 0.050 mg/L |
| Chromium | 0.33 mg/L |
| Lead | 0.15 mg/L |
| Mercury | 0.009 mg/L |
| Nickel | 1 mg/L |
| Selenium | 0.16 mg/L |
| Silver | 0.30 mg/L |
| 'thallium | 0.020 mg/L |
| Vanadium | 2 mg/L |
| Zinc | 70 mg/L. |

29. In a method of stabilizing a hazardous waste containing EAFD including forming a mixture of said hazardous waste and water, wherein said mixture further comprises lime from at least one of the group consisting of inherent lime from said EAFD and added lime, the improvement comprising including in said mixture a supplemental agent comprising potassium magnesium sulfate, wherein a leachate formed by exposing said mixture to an alkaline aqueous extraction solution has decreased concentrations of heavy metals.

30. The method of claim 29, wherein the concentrations of the heavy metals in the leachate are below the following limits:

| | |
|---|---|
| Antimony | 1.15 mg/L |
| Arsenic | 5 mg/L |
| Barium | 21 mg/L |
| Beryllium | 1.22 mg/L |
| Cadmium | 0.11 mg/L |
| Chromium | 0.6 mg/L |
| Lead | 0.75 mg/L |
| Mercury | 0.025 mg/L |
| Nickel | 11 mg/L |
| Selenium | 5.7 mg/L |
| Silver | 0.14 mg/L |
| Thallium | 0.2 mg/L |
| Zinc | 4.3 mg/L. |

31. The method of claim 29, wherein the concentrations of the heavy metals in the leachate are below the following limits:

| | |
|---|---|
| Antimony | 0.06 mg/L |
| Arsenic | 0.50 mg/L |
| Barium | 7.6 mg/L |
| Beryllium | 0.010 mg/L |
| Cadmium | 0.050 mg/L |
| Chromium | 0.33 mg/L |
| Lead | 0.15 mg/L |
| Mercury | 0.009 mg/L |
| Nickel | 1 mg/L |
| Selenium | 0.16 mg/L |
| Silver | 0.30 mg/L |
| Thallium | 0.020 mg/L |
| Vanadium | 2 mg/L |
| Zinc | 70 mg/L. |

* * * * *

UNITED STATES PATENT AND TRADEMARK OFFICE

CERTIFICATE OF CORRECTION

PATENT NO. : 6,679,823 B2
DATED : January 20, 2004
INVENTOR(S) : Charles L. Smith It is certified that error appears in the above-identified patent and that said Letters Patent is hereby corrected as shown below:

Column 15,
Line 27, delete "EAM" and insert therefor -- EAFD --.

Column 19,
Line 9, delete " 'thalium 0.020 mg/L"
and insert therefor -- Thalium 0.020 mg/L --.

Signed and Sealed this

Fifteenth Day of June, 2004

JON W. DUDAS
*Acting Director of the United States Patent and Trademark Office*